(12) United States Patent
Arakane et al.

(10) Patent No.: US 10,919,313 B2
(45) Date of Patent: Feb. 16, 2021

(54) IMAGE PROCESSING APPARATUS CONTROLLING PRINTING ACCORDING TO UNIDIRECTIONAL PRINTING METHOD OR BIDIRECTIONAL PRINTING METHOD

(71) Applicant: Brother Kogyo Kabushiki Kaisha, Nagoya (JP)

(72) Inventors: Satoru Arakane, Nagoya (JP); Masashi Kuno, Obu (JP); Shota Morikawa, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 16/525,691

(22) Filed: Jul. 30, 2019

(65) Prior Publication Data

US 2020/0039234 A1 Feb. 6, 2020

(30) Foreign Application Priority Data

Aug. 6, 2018 (JP) .............................. JP2018-147987

(51) Int. Cl.
| | | |
|---|---|---|
| *B41J 2/21* | (2006.01) | |
| *H04N 1/50* | (2006.01) | |
| *H04N 1/195* | (2006.01) | |
| *B41J 19/14* | (2006.01) | |
| *H04N 1/00* | (2006.01) | |
| *H04N 1/60* | (2006.01) | |

(52) U.S. Cl.
CPC .......... *B41J 2/2132* (2013.01); *B41J 19/147* (2013.01); *H04N 1/00708* (2013.01); *H04N 1/19515* (2013.01); *H04N 1/502* (2013.01); *H04N 1/6008* (2013.01)

(58) Field of Classification Search
None
See application file for complete search history.

(56) References Cited

U.S. PATENT DOCUMENTS

| | | | |
|---|---|---|---|
| 9,571,696 B2 | 2/2017 | Morikawa | |
| 2012/0236057 A1* | 9/2012 | Sakakibara | ............ B41J 19/147 347/14 |
| 2016/0191745 A1 | 6/2016 | Morikawa | |

FOREIGN PATENT DOCUMENTS

| | | |
|---|---|---|
| JP | 2005-342962 A | 12/2005 |
| JP | 2016-124138 A | 7/2016 |

* cited by examiner

*Primary Examiner* — Erica S Lin
(74) *Attorney, Agent, or Firm* — Banner & Witcoff, Ltd.

(57) ABSTRACT

In an image processing apparatus, a processor sets a target printing method for printing a target image to one of a bidirectional printing method and a unidirectional printing method. In a case where the bidirectional printing method is set as the target printing method: the processor executes both a first generation process and a second generation process. The first generation process generates first partial print data by converting a set of partial image data using a first color conversion profile. The second generation process generates second partial print data by converting another set of partial image data using a second color conversion profile. In a case where the unidirectional printing method is set as the target printing method, the processor executes a third generation process generating third partial print data by converting a set of partial image data using a third color conversion profile.

10 Claims, 8 Drawing Sheets

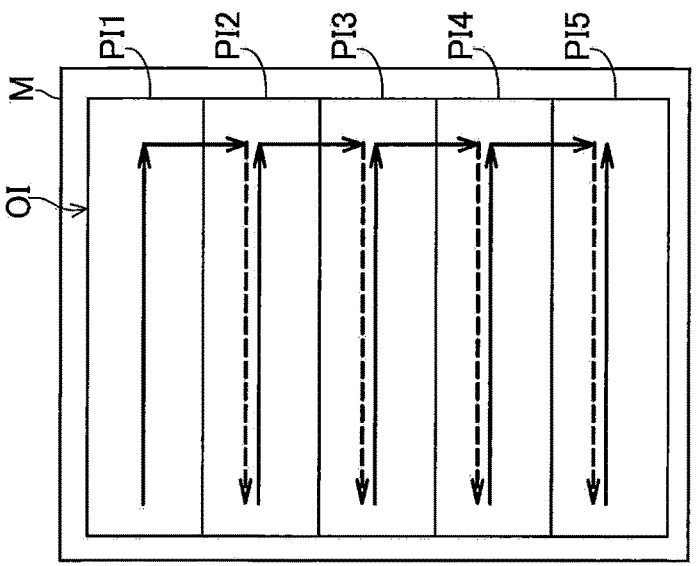
FIG. 3 (C) UNIDIRECTIONAL PRINTING METHOD
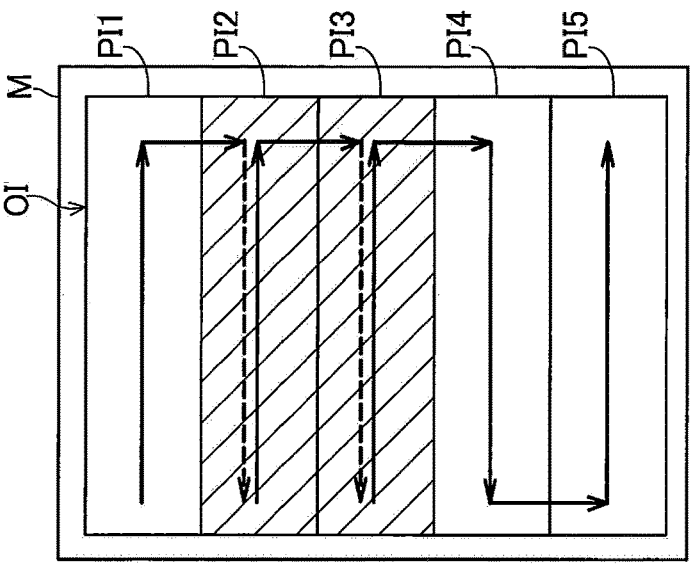
FIG. 3 (B) PARTIALLY-BIDIRECTIONAL PRINTING METHOD
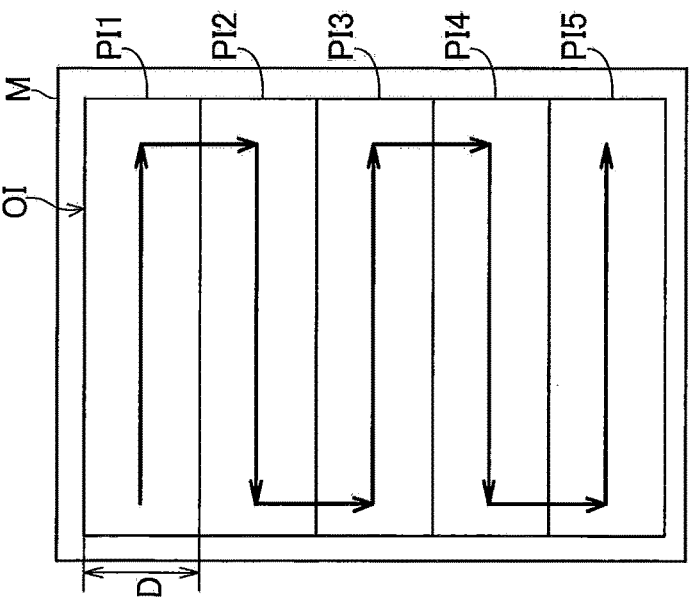
FIG. 3 (A) ABSOLUTELY-BIDIRECTIONAL PRINTING METHOD

IMAGE PROCESSING APPARATUS CONTROLLING PRINTING ACCORDING TO UNIDIRECTIONAL PRINTING METHOD OR BIDIRECTIONAL PRINTING METHOD

CROSS REFERENCE TO RELATED APPLICATION

This application claims priority from Japanese Patent Application No. 2018-147987 filed Aug. 6, 2018. The entire content of the priority application is incorporated herein by reference.

TECHNICAL FIELD

The present disclosure relates to an image process for a print execution unit that performs printing by executing a partial print to form dots while performing a main scan and a sub scan a plurality of times.

BACKGROUND

A conventional printing system operates according to a bidirectional printing method in which a combination of an outgoing print and a return print are performed. The outgoing print is performed while the main scanning of the outgoing direction is performed. The return print is performed while the main scanning of the return direction is performed. The color conversion profile used in such bidirectional printing includes two types of CMYK values correlated to some RGB values. Here, the two types of CMYK values include CMYK values for the outgoing print and CMYK values for the return print. When print data for the outgoing print is generated, the RGB values are converted to the CMYK values for the outgoing print. When print data for the return print is generated, the RGB values are converted to the CMYK values for the return print.

SUMMARY

However, in the printing system, the CMYK values for the return print are based merely on the profile for the outgoing print, for example. Thus, if the difference between the color gamut representable by outgoing print and the color gamut representable by the return print is large, this conventional technique cannot suppress irregularities in an image generated through a combination of the outgoing print and the return print.

In view of the foregoing, it is an object of the present disclosure to provide a technique of bidirectional printing that can suppress color irregularities and a technique of unidirectional printing with a color gamut larger than the color gamut of bidirectional printing.

In order to attain the above and other objects, the disclosure provides an image processing apparatus. The image processing apparatus includes a processor and a memory. The processor is for controlling a print execution unit including: a print head moving in a main scanning direction including a first direction and a second direction opposite the first direction, the print head including a first nozzle configured to eject first type ink, and a second nozzle configured to eject second type ink, the second nozzle being positioned apart from the first nozzle in the main scanning direction; a main scanning unit configured to perform a main scan, the main scan including a first main scan to move the print head in the first direction as a printing direction, and a second main scan to move the print head in the second direction as the printing direction; and a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, the target image being based on target image data having a plurality of sets of partial image data representing respective ones of a plurality of partial images in the target image, the partial print being one of a first partial print and a second partial print, wherein in the first partial print the print head forms dots on the recording sheet for printing a partial image in the target image while the main scanning unit performs the first main scan, the first partial print being printable colors forming a first color gamut, wherein in the second partial print the print head forms dots on the recording sheet for printing a partial image in the target image while the main scanning unit performs the second main scan, the second partial print being printable colors forming a second color gamut, the first color gamut including a common gamut and a first special gamut, the second color gamut including the common gamut and a second special gamut different from the first special gamut. The memory stores a first color conversion profile, a second color conversion profile, and a third color conversion profile, each of the first color conversion profile, the second color conversion profile, and the third color conversion profile being used for converting a first type color value into a second type color value having a plurality of component values corresponding to respective ones of a plurality of types of ink including the first type ink and the second type ink, the first color conversion profile and the second color conversion profile being adjusted so that a first printed color approaches a second printed color, wherein the first printed color is printed through the first partial print based on a first converted color value which is one of the second type color value converted from an original color of the first type color value by using the first color conversion profile, and the second printed color is printed through the second partial print based on a second converted color value which is one of the second type color value converted from the original color by using the second color conversion profile, the first color conversion profile being used for generating data for performing the first partial print in a bidirectional printing method, the second color conversion profile being used for generating data used for generating data for performing the second partial print in the bidirectional printing method, the third color conversion profile being used for generating data for a unidirectional printing method, wherein in the bidirectional printing method the print execution unit prints the target image using both the first partial print and the second partial print, and in the unidirectional printing method the print execution unit prints the target image using the first partial print without using the second partial print. When the first partial print prints colors based on color values of the second type color value converted from original color values of the first type color value by using the first color conversion profile, a color gamut formed by the colors printed by the first partial print excludes at least part of the first special gamut. When the second partial print prints colors based on color values of the second type color value converted from original color values of the first type color value by using the second color conversion profile, a color gamut formed by the colors printed by the second partial print excludes at least part of the second special gamut. When the first partial print prints colors based on color values of the second type color value converted from original color values of the first type color value by using the third color conversion profile, a color gamut formed by the colors printed by the first partial print includes the common gamut and the first special gamut. The processor is configured to perform: setting a target printing method for printing the target image on the recording sheet to one of a plurality of printing methods including the bidirectional printing method and the unidirectional printing method; in a case where the bidirectional printing method is set as the target printing method: executing both a first generation process and a second generation process, the first generation process generating first partial print data by converting a set of partial image data using the first color conversion profile, the second generation process generating second partial print data by converting another set of partial image data using the second color conversion profile; and controlling the print execution unit to perform printing according to the bidirectional printing method by using the first partial print data for the first partial print and the second partial print data for the second partial print; and in a case where the unidirectional printing method is set as the target printing method: executing a third generation process generating third partial print data by converting a set of partial image data using the third color conversion profile; and controlling the print execution unit to perform printing according to the unidirectional printing method by using the third partial print data for the first partial print.

According to another aspect, the disclosure provides a non-transitory computer readable storage medium storing a set of program instructions for an image processing apparatus, the image processing apparatus controlling a print execution unit including: a print head moving in a main scanning direction including a first direction and a second direction opposite the first direction, the print head including a first nozzle configured to eject first type ink, and a second nozzle configured to eject second type ink, the second nozzle being positioned apart from the first nozzle in the main scanning direction; a main scanning unit configured to perform a main scan, the main scan including a first main scan to move the print head in the first direction as a printing direction, and a second main scan to move the print head in the second direction as the printing direction; and a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, the target image being based on target image data having a plurality of sets of partial image data representing respective ones of a plurality of partial images in the target image, the partial print being one of a first partial print and a second partial print, wherein in the first partial print the print head forms dots on the recording sheet for printing a partial image in the target image while the main scanning unit performs the first main scan, the first partial print being printable colors forming a first color gamut, wherein in the second partial print the print head forms dots on the recording sheet for printing a partial image in the target image while the main scanning unit performs the second main scan, the second partial print being printable colors forming a second color gamut, the first color gamut including a common gamut and a first special gamut, the second color gamut including the common gamut and a second special gamut different from the first special gamut, the image processing apparatus including a memory storing a first color conversion profile, a second color conversion profile, and a third color conversion profile, each of the first color conversion profile, the second color conversion profile, and the third color conversion profile being used for converting a first type color value into a second type color value having a plurality of component values corresponding to respective ones of a plurality of types of ink including the first type ink and the second type ink, the first color conversion profile and the second color conversion profile being adjusted so that a first printed color approaches a second printed color, wherein the first printed color is printed through the first partial print based on a first converted color value which is one of the second type color value converted from an original color of the first type color value by using the first color conversion profile, and the second printed color is printed through the second partial print based on a second converted color value which is one of the second type color value converted from the original color by using the second color conversion profile, the first color conversion profile being used for generating data for performing the first partial print in a bidirectional printing method, the second color conversion profile being used for generating data used for generating data for performing the second partial print in the bidirectional printing method, the third color conversion profile being used for generating data for a unidirectional printing method, wherein in the bidirectional printing method the print execution unit prints the target image using both the first partial print and the second partial print, and in the unidirectional printing method the print execution unit prints the target image using the first partial print without using the second partial print, wherein when the first partial print prints colors based on color values of the second type color value converted from original color values of the first type color value by using the first color conversion profile, a color gamut formed by the colors printed by the first partial print excludes at least part of the first special gamut, wherein when the second partial print prints colors based on color values of the second type color value converted from original color values of the first type color value by using the second color conversion profile, a color gamut formed by the colors printed by the second partial print excludes at least part of the second special gamut, wherein when the first partial print prints colors based on color values of the second type color value converted from original color values of the first type color value by using the third color conversion profile, a color gamut formed by the colors printed by the first partial print includes the common gamut and the first special gamut. The set of program instructions includes: setting a target printing method for printing the target image on the recording sheet to one of a plurality of printing methods including the bidirectional printing method and the unidirectional printing method; in a case where the bidirectional printing method is set as the target printing method: executing both a first generation process and a second generation process, the first generation process generating first partial print data by converting a set of partial image data using the first color conversion profile, the second generation process generating second partial print data by converting another set of partial image data using the second color conversion profile; and controlling the print execution unit to perform printing according to the bidirectional printing method by using the first partial print data for the first partial print and the second partial print data for the second partial print; and in a case where the unidirectional printing method is set as the target printing method: executing a third generation process generating third partial print data by converting a set of partial image data using the third color conversion profile; and controlling the print execution unit to perform printing according to the unidirectional printing method by using the third partial print data for the first partial print.

BRIEF DESCRIPTION OF THE DRAWINGS

The particular features and advantages of the disclosure as well as other objects will become apparent from the following description taken in connection with the accompanying drawings, in which:

FIG. 3(A) is an explanation diagram illustrating an operation of the printing mechanism in an absolutely-bidirectional printing method;

FIG. 3(B) is an explanation diagram illustrating an operation of the printing mechanism in a partially-bidirectional printing method;

FIG. 3(C) is an explanation diagram illustrating an operation of the printing mechanism in a unidirectional printing method;

DETAILED DESCRIPTION

A. First Embodiment

A-1. Configuration of Printing System 1000

Figure 1:
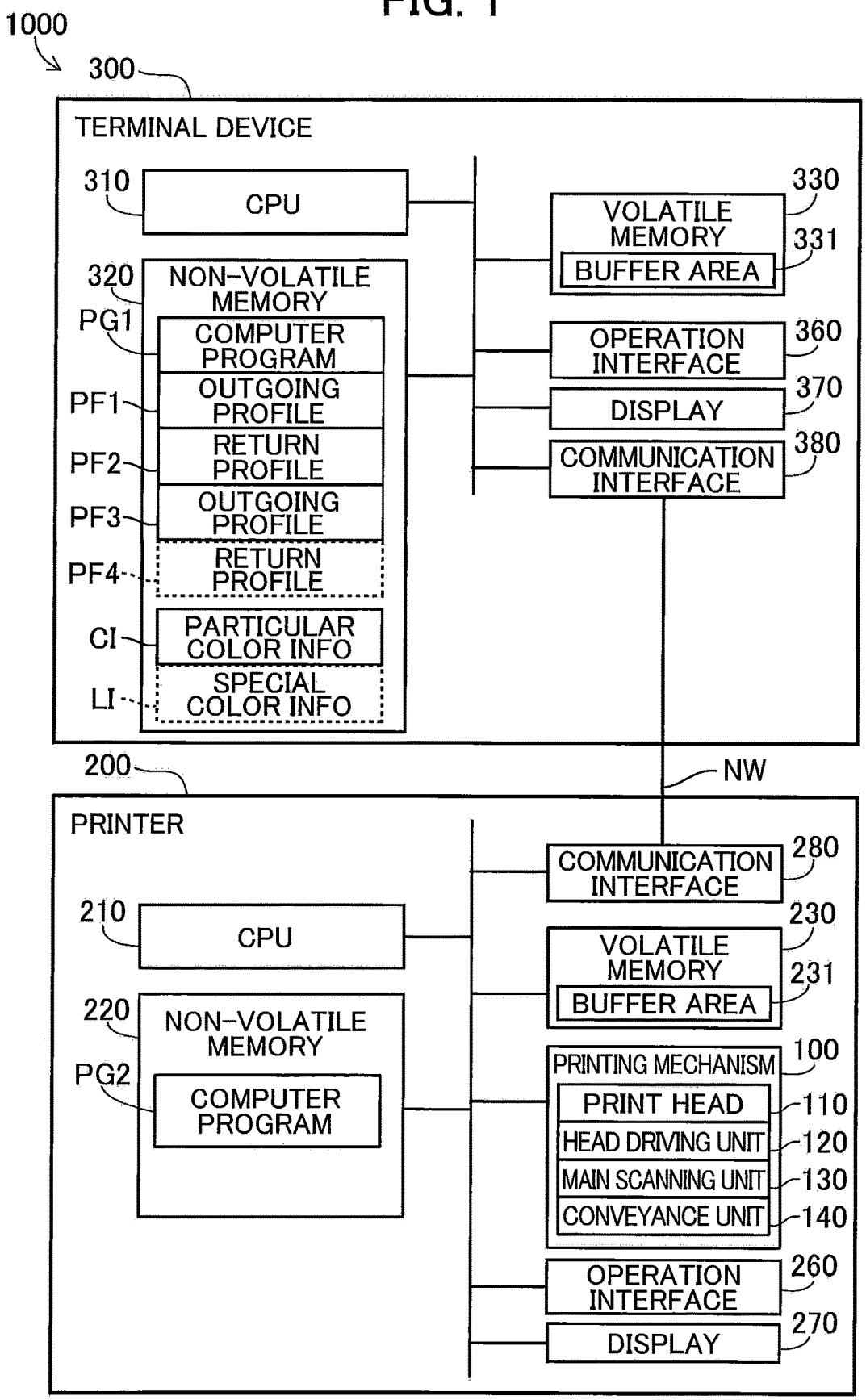
FIG. 1 is a block diagram illustrating a configuration of a printing system according to an embodiment.

The first embodiment will be described through examples. FIG. 1 is a block diagram illustrating the configuration of a printing system 1000 according to an embodiment.

The printing system 1000 includes a printer 200 and a terminal device 300 functioning as an image processor according to this embodiment. The printer 200 and the terminal device 300 are connected to each other to establish communication via a wire or wireless network NW.

The terminal device 300 is a calculator used by the user of the printer 200 and, for example, is a personal computer or a smart phone. The terminal device 300 includes a central processing unit (CPU) 310 functioning as a controller of the terminal device 300; a non-volatile memory 320, such as a hard disk drive; a volatile memory 330, such as a random access memory (RAM); an operation interface 360, such as a mouse and a keyboard; a display 370, such as a liquid crystal display; and a communication interface 380. The communication interface 380 includes a wire or wireless interface in connection with the network NW.

The volatile memory 330 provides a buffer area 331 for the CPU 310. The non-volatile memory 320 stores a computer program PG1, a plurality of profiles PF1-PF3 (described later), and particular color information CI. The computer program PG1, the profiles PF1 to PF3, and the particular color information CI are provided by the manufacturer of the printer 200, for example, in the form of data downloaded from a server or data stored in a DVD-ROM. The CPU 310 functions as a printer driver controlling the printer 200 by executing the computer program PG1. The CPU 310 as the printer driver performs an image process described below so as to control the printer 200 to print an image.

Each of the plurality of profiles PF1-PF3 defines a correlation between color values in the RGB color system (RGB values) and color values in the CMYK color system (CMYK values). The plurality of profiles PF1-PF3 is used for a color conversion process in an image process (described later) for converting RGB values to CMYK values. Each RGB value is a color value including three component values of red (R), green (G), and blue (B) colors. Each CMYK value is a color value including multiple component values corresponding to the number of inks used for printing. In this embodiment, each CMYK value includes component values of cyan (C), magenta (M), yellow (Y), and black (K) colors. Each of the RGB values and the CMYK values is, for example, 256 gradation value. The plurality of profiles PF1-PF3 is lookup tables for example. The plurality of profiles PF1-PF3, and the particular color information CI will be described below.

The printer 200 includes, for example, a printing mechanism 100; a CPU 210 functioning as a controller of the printer 200; a non-volatile memory 220, such as a hard disk drive; a volatile memory 230, such as a RAM; an operation interface 260, such as buttons and a touch panel for receiving a user operation; a display 270, such as a liquid crystal display; and a communication interface 280. The communication interface 280 includes a wire or wireless interface in connection with the network NAV. The printer 200 is connected to an external device, e.g., the terminal device 300, to establish communication with each other via the communication interface 280.

The volatile memory 230 provides a buffer area 231 for temporarily storing various types of intermediate data generated during processing by the CPU 210. The non-volatile memory 220 stores the computer program PG2. The computer program PG2 in this embodiment is a control program for controlling the printer 200. The computer program PG2 can be stored in the non-volatile memory 220 before shipment of the printer 200. Alternatively, the computer program PG2 may be provided in the form of data downloaded from a server or data stored on a DVD-ROM. The CPU 210 executes the computer program PG2 to control the printing mechanism 100 in accordance with, for example, print data or direction information (described below) sent from the terminal device 300 during the image process described below, and to print an image on a print medium (for example, a sheet).

The printing mechanism 100 performs printing by ejecting ink droplets of the CMYK colors. The printing mechanism 100 includes a print head 110, a head driving unit 120, a main scanning unit 130, and a conveyance unit 140.

Figure 2:
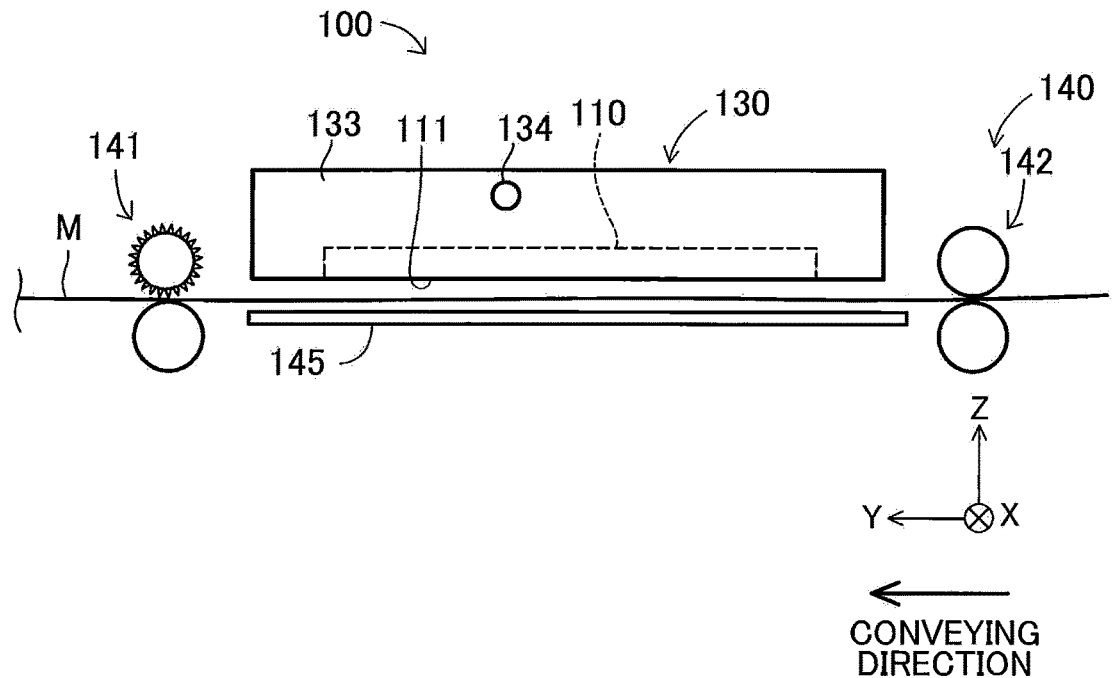
FIG. 2(A) is an explanation diagram illustrating a configuration of a printing mechanism.
FIG. 2(B) is an explanation diagram illustrating a configuration of a print head.
Figure 2:
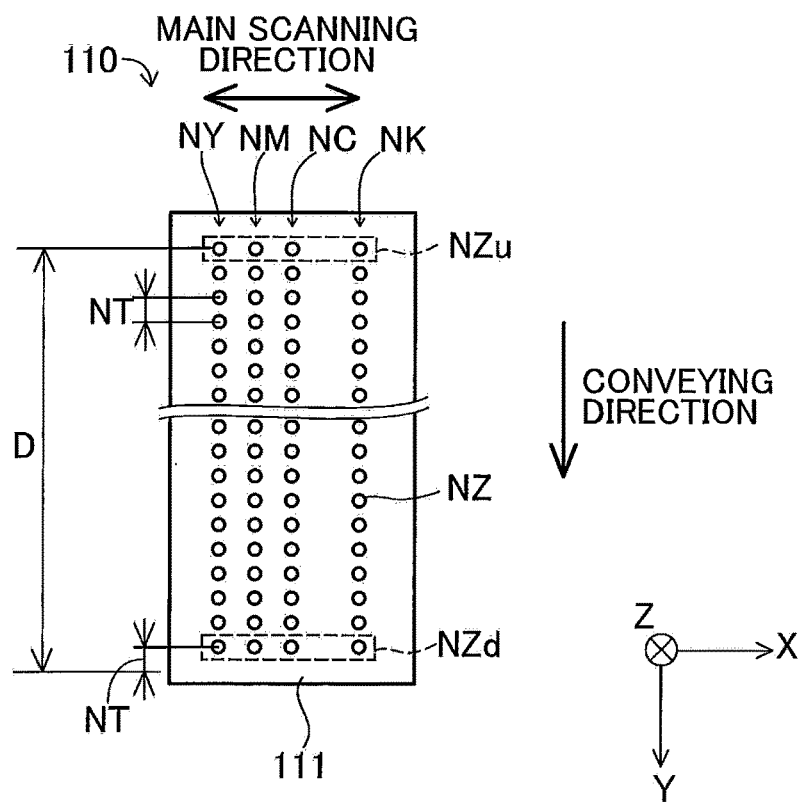

FIG. 2(A) illustrates the overall configuration of the printing mechanism 100. With reference to FIG. 2(A), the main scanning unit 130 includes a carriage 133 carrying the print head 110 and a sliding shaft 134 holding the carriage 133 such that the carriage 133 can reciprocate in the main scanning direction or the X direction in FIG. 2(A). The main scanning unit 130 uses the power from a main scanning motor (not illustrated) to reciprocate the carriage 133 along the sliding shaft 134. Accordingly, the main scanning is performed in such a manner that the print head 110 is reciprocated relative to a sheet M in the main scanning direction. Here, the sheet M is a paper for example.

The conveyance unit 140 supports and conveys the sheet M in the conveying direction (the +Y direction in FIG. 2(A)) orthogonal to the main scanning direction. The conveyance unit 140 includes a sheet table 145, two upstream rollers 142, and two downstream rollers 141, as illustrated in FIG. 2(A). Hereinafter, the upstream side (−Y side) in the conveying direction may also be referred to as "upstream side," and the downstream side (+Y side) in the conveying direction may also be referred to as "downstream side."

The upstream rollers 142 hold the sheet M at a position on the upstream side (−Y side) of the print head 110. The downstream rollers 141 hold the sheet M at a position on the downstream side (+Y side) of the print head 110. The sheet table 145 is disposed at a position between the upstream rollers 142 and the downstream rollers 141 and faces a nozzle face 111 formed in the print head 110. The downstream rollers 141 and the upstream rollers 142 are driven by a conveying motor (not illustrated) to convey the sheet M.

The head driving unit 120 (see FIG. 1) feeds drive signal to the print head 110 to drive the print head 110 while the main scanning unit 130 performs main scanning of the print head 110. The print head 110 ejects ink in accordance with the drive signal onto the sheet conveyed by the conveyance unit 140, to form dots on the sheet.

FIG. 2(B) illustrates the configuration of the print head 110 viewed from the −Z side (from below in FIG. 2(A)). As shown in FIG. 2(B), the nozzle face 111 of the print head 110 has multiple nozzle rows. Each nozzle row includes an array of nozzles. Specifically, the nozzle face 111 has nozzle rows NC, NM, NY, and NK respectively ejecting inks of the CMYK colors. Each nozzle row includes a plurality of nozzles NZ having different positions in the conveying direction (+Y direction) one another. The nozzles NZ are disposed at a predetermined pitch NT in the conveying direction (+Y direction). The pitch NT corresponds to the distance between any two nozzles NZ adjacent to each other in the conveying direction. Among the nozzles NZ in the nozzle rows NC, NM, NY, and NK, nozzles NZ disposed on the most upstream side (−Y side) are referred to as "most upstream nozzles NZu." Among the nozzles NZ in the nozzle rows NC, NM, NY, and NK, nozzles NZ disposed at the most downstream side (+Y side) are referred to as "most downstream nozzles NZd." The sum of the distance between a most upstream nozzle NZu and a corresponding most downstream nozzle NZd in the conveying direction and one pitch NT is referred to as "nozzle array length D."

The nozzle rows NC, NM, NY, and NK are disposed apart from each other in the main scanning direction and are disposed at the same position in the sub scanning direction. As shown in FIG. 2(B), the nozzles rows NY, NM, NC, and NK are arranged in this order in the +X direction. For example, in the example illustrated in FIG. 2(B), the nozzle row NM is disposed downstream of the nozzle row NY in the +X direction. Here, the nozzle NY consists of nozzles ejecting Y color ink.

A-2. Overview of Printing

The printing mechanism 100 alternately performs partial print and sub-scanning several times to print an image OI on a sheet M. In the partial print, the print head 110 forms ink dots on the sheet M while the main scanning unit 130 performs main scanning. In the sub-scanning, the sheet M is conveyed in the sub-scanning direction (conveying direction) by the conveyance unit 140.

FIGS. 3(A)-3(C) illustrate the operation of the printing mechanism 100. FIG. 3(A)-3(C) illustrate the image OI printed on the respective sheet M. The image OI includes a plurality of partial images PI. In the example illustrated in FIG. 3(A)-3(C), the image OI1 includes partial images PI1-PI5. Each partial image PI is an image printed by one partial print. In the partial print, the nozzles NZ ejects inks while the print head 110 is moved in either the forward or the backward with respect to the main scanning direction. Hereinafter, the direction in which the print head 110 is moved during printing is referred to as the printing direction, and the forward in the main scanning direction (+X direction) is referred to the outgoing direction, and the backward in the main scanning direction (−X direction) is referred to as the return direction. The printing direction of partial print is either one of the outgoing direction or the return direction. That is, each partial print is either one of the outgoing print and return print. The outgoing print forms dots while the main scanning in the outgoing direction (+X direction of FIG. 3) is performed. The return print forms dots while the main scanning in the return direction (−X direction of FIG. 3) is performed. In FIGS. 3(A)-3(C), solid arrows indicating the +X or −X direction are drawn in each partial image. The partial images (for examples PI1, PI3, PI5 of FIG. 3(A)) with the solid arrows in the +X direction are outgoing partial images which are printed by the outgoing prints. The partial images (for examples, PI2, and PI4 of FIG. 3(A)) with the solid arrows in the −X direction are return partial images which are printed by the return prints.

In FIG. 3, each arrow extending in the −Y direction from one partial image PI (for example, the partial image PI1) to another partial image PI (for example, the partial image PI2) which is adjacent with the one partial image PI in the −Y direction indicates the conveyance (sub-scanning) of the sheet M. In other words, an arrow in the −Y direction in FIG. 3 indicates the shift of the print head 110 in the −Y direction relative to the sheet M due to the conveyance of the sheet M. The printing according to this embodiment is single pass printing. That is, the length of each partial image in the conveying direction is equal to the nozzle array length D, and the conveyance amount of the sheet M by one conveyance is equal to the nozzle array length D.

In this embodiment, an image O1 is printed in a bidirectional printing method or a unidirectional printing method. In the bidirectional printing method, a combination of the outgoing print and the return print is performed. The bidirectional printing methods includes two methods, that is, an absolutely-bidirectional printing method (FIG. 3(A)) and a partially bidirectional printing (FIG. 3(B)). In the absolutely-bidirectional printing method, the outgoing print and the return print motion are alternately performed constantly. In other words, in the absolutely-bidirectional printing method, two outgoing prints are not performed in succession, and two return prints are not performed in succession. In the partially-bidirectional printing method, the outgoing print and the return print motions are both performed, and two outgoing prints may be performed in succession or two return print may be performed in succession. In the example illustrated in FIG. 3(B), the partial images PI1 to PI3 are printed through three consecutive outgoing prints. As illustrated in FIG. 3(A), in the unidirectional printing method, only outgoing print is performed. Alternatively, in the unidirectional printing method, only return print may be performed.

In this embodiment, the printing resolution and the number of passes in the bidirectional printing method are the same as the printing resolution and the number of passes in the unidirectional printing method. The term "the number of passes" refers to the number of times that the partial prints are performed for printing all the partial images (or all regions) in an image OI. Each of the bidirectional printing method and the unidirectional printing method according to this embodiment are one path printing (the number of passes=1), that is, one partial image PI is formed by single partial print. The printing resolution in the X and Y directions in the bidirectional printing method is the same as the printing resolution in the X and Y directions in the unidirectional printing method.

When partial prints with the same direction set as the printing direction are performed in succession, main scanning is performed without dot formation between two consecutive partial prints. Main scanning without dot formation (i.e., without printing a partial image) may also be referred to as "no-print main scanning". The dashed arrows in FIGS. 3(B) and 3(C) represent no-print main scanning. For example, in FIG. 3(B), no-print main scanning is performed during a period between the outgoing print for forming the partial image PI1 and the outgoing print for forming the partial image PI2, and a period between the outgoing print for forming the partial image PI2 and the outgoing print for forming the partial image PI3. In the unidirectional printing method illustrated in FIG. 3(C), no-print main scanning is performed after every outgoing print. By performing no-print scanning, the overall time required for printing an entire image is extended in comparison to when no-print main scanning is not performed. Thus, the printing speed is the highest in the absolutely-bidirectional printing method, the second highest in the partially-bidirectional printing method, and the least high in the unidirectional printing method.

As shown in the print head 110 of FIG. 2(B), the nozzle rows NC, NM, NY, and NK for the respective CMYK colors are disposed at different positions in the main scanning direction. Comparing the outgoing print with the return print in a case where dots of the CMYK colors are formed at a predetermined position on a sheet M, an order of formation of the CMYK color dots by the outgoing print is different from an order of formation of the CMYK color dots by the return print. For example, in the example shown in FIG. 2(B), because the nozzle rows NY, NM, NC, and NK are arranged in this order in +X direction, the CMYK color dots are formed in the order of K, C, M, and Y through the outgoing print. In contrast, the CMYK color dots are formed in the order of Y, M, C, and K through the return print. In other words, in regions of the image in which different color dots are overlaid each other, the overlaying order of the CMYK dots differs between the outgoing print and the return print. This difference in the overlaying order may cause the printed outgoing partial image and the printed return partial image to have different color tones even when the outgoing partial image and the return partial image are printed using the same dot data. Such a color difference between the outgoing partial image and the return partial image is referred to as "outgoing/return color difference."

Figure 4:
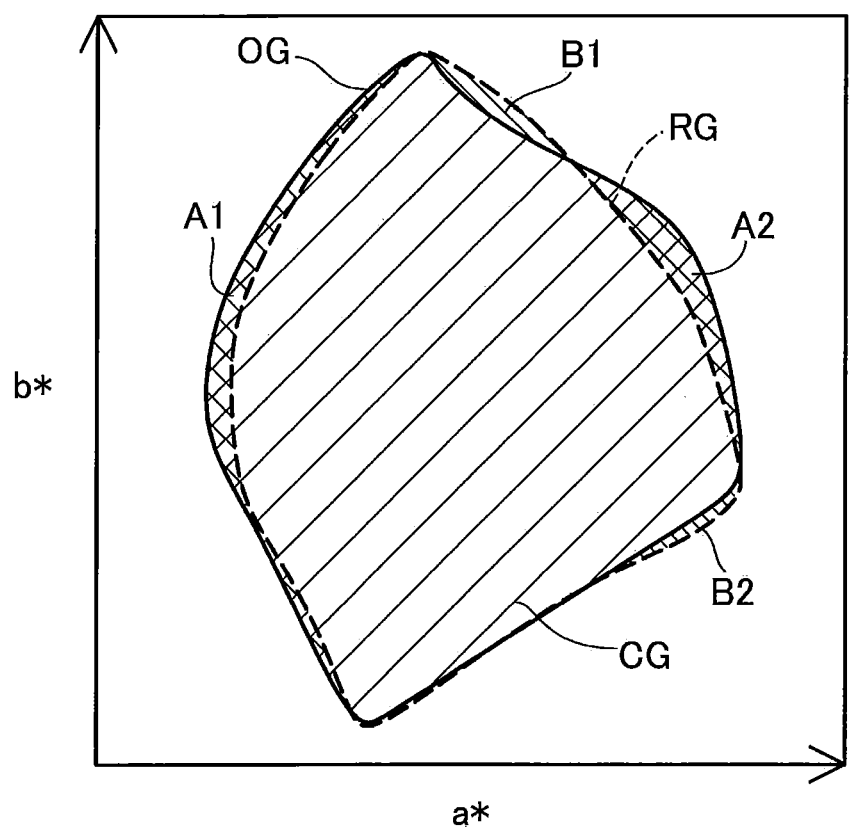
FIG. 4 is an explanatory diagram illustrating color gamuts representable by an outgoing print and a return print.

The outgoing/return color difference leads to a difference between the color gamut representable by the outgoing print and the color gamut representable by the return print. FIG. 4 is a conceptual diagram of the color gamut representable by the outgoing print and the color gamut representable by the return print. FIG. 4 illustrates the color gamuts in a CIELAB color space, which is a color space independent from a device such as the print execution unit used for printing. The solid line indicates an outgoing color gamut OG corresponding to the color gamut representable by the outgoing print, and the dashed line indicates a return color gamut RG corresponding to the color gamut representable by the return print. The outgoing color gamut OG includes color sub-gamuts A1 and A2 indicating colors representable by the outgoing print but not in the return print. The return color gamut RG includes color sub-gamuts B1 and B2 indicating colors representable by the return print but not in the outgoing print.

The outgoing profile PF1 and the return profile PF2 are for the bidirectional printing method. Specifically, the outgoing profile PF1 is used for generating partial print data for one outgoing print in the bidirectional printing method (the absolutely-bidirectional printing method and the partially-bidirectional printing method). The return profile PF2 is used for generating partial print data for one return print in the bidirectional printing method. The profiles PF1 and PF2 are generated by using color matching in order to reduce the outgoing/return color difference. Specifically, the profiles PF1 and PF2 for the bidirectional printing method are adjusted such that the color of the outgoing partial image printed in accordance with the CMYK value converted from a specific RGB value based on the outgoing profile PF1 approach the color of the return partial image printed in accordance with the CMYK value converted from the specific RGB value based on the return profile PF2.

The color gamut representable by the outgoing print using the outgoing profile PF1 is substantially the same as a common color gamut CG (see FIG. 4) shared by the outgoing color gamut OG and the return color gamut RG. The common color gamut CG does not include the color sub-gamuts A1 and A2 indicating colors representable by the outgoing print but not in the return print and the color sub-gamuts B1 and B2 indicating colors representable by the return print but not in outgoing print. Thus, the color gamut representable by the outgoing print using the outgoing profile PF1 is smaller than the outgoing color gamut OG indicating colors inherently representable by outgoing print. The color gamut representable by the return print using the return profile PF2 is substantially the same as also the common color gamut CG. Thus, the color gamut representable by return print using the return profile PF2 is smaller than the return color gamut RG indicating colors inherently representable by return print. By using the profiles PF1 and PF2 adjusted as described above, the outgoing/return color difference can be reduced although the color gamut representable by the bidirectional printing method is limited to the common color gamut CG.

The outgoing profile PF3 for the unidirectional printing method is used for generating partial print data for the outgoing print in the unidirectional printing method. The color gamut representable by outgoing print using the outgoing profile PF3 is substantially the same as the outgoing color gamut OG inherently representable by the outgoing print. Thus, the color gamut representable by the outgoing print using the outgoing profile PF3 includes the common color gamut CG and the color sub-gamuts A1 and A2 indicating colors representable by outgoing print but not in return print.

As described above, the color gamut representable by the bidirectional printing method is smaller than the color gamut representable by the unidirectional printing method. Thus, the image quality of the image OI printed in the bidirectional printing method may be lower than the image quality of the image OI printed in the unidirectional printing method.

In the bidirectional printing method, for some particular colors, outgoing/return color differences are large. In some cases, such outgoing/return color differences cannot be reduced even if the outgoing profile PF1 and the return profile PF2 are used. More specifically, though the color gamuts of the outgoing profile PF1 and the return profile PF2 are substantially the same as the common color gamut CG as described above, the actually printed color printed by the outgoing print while converting an RGB value of a particular color using the outgoing profile PF1 is different from the actually printed color printed by the return print by converting the same RGB value of the particular color using the return profile PF2. The particular color information CI (see FIG. 1) indicates such particular colors producing a large outgoing/return color difference. For example, the particular color information CI indicates the range of the particular colors in an RGB color space. The outgoing/return color difference is not caused in the unidirectional printing method because the image OI is printed through only outgoing print. In this context, the image quality of the image OI printed in the bidirectional printing method may be lower than the image quality of the image OI printed in the unidirectional printing method.

A-3. Image Process

Figure 5:
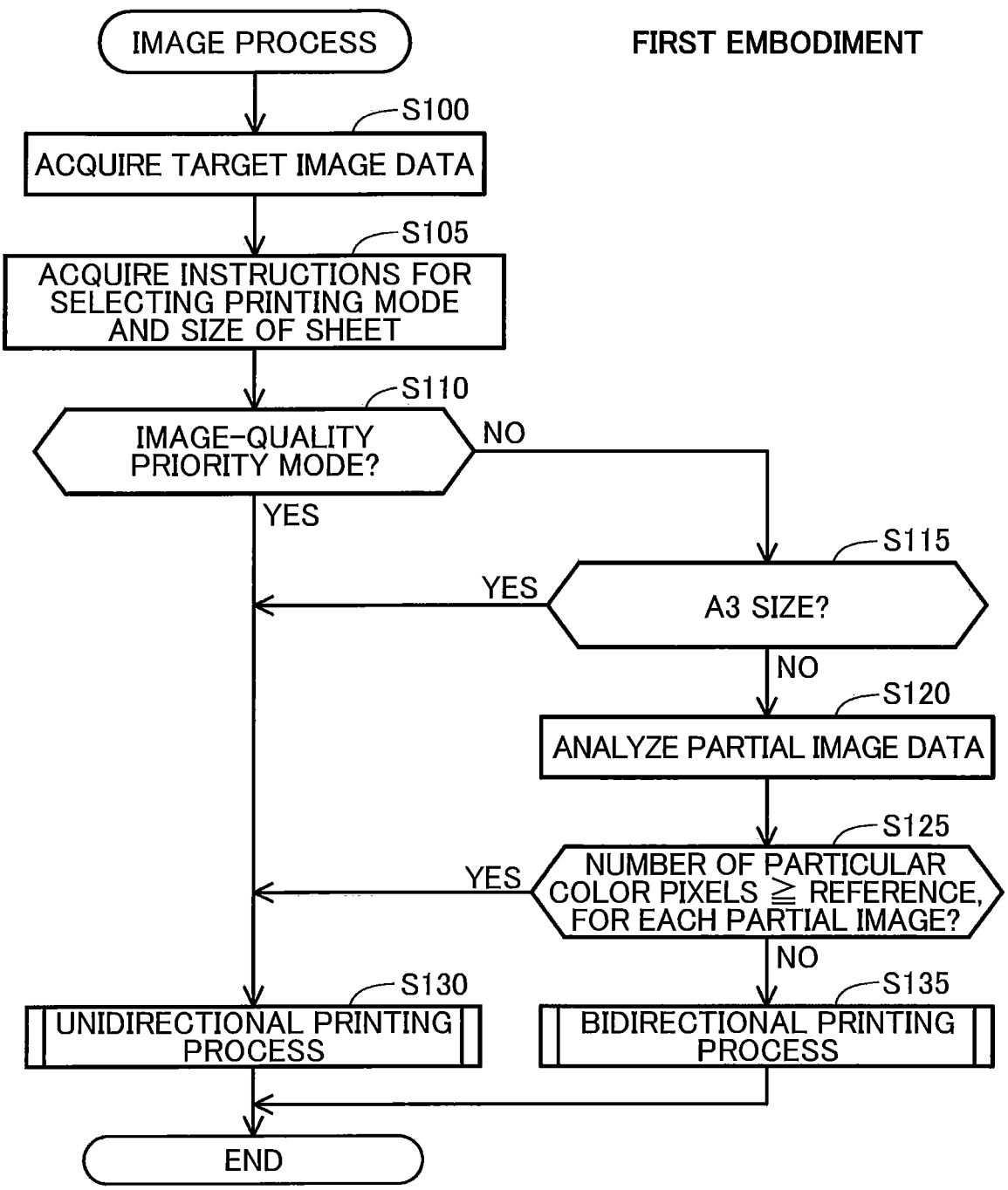
FIG. 5 is a flowchart illustrating an image process according to a first embodiment.

FIG. 5 is a flowchart illustrating an image process according to the first embodiment. The CPU 310 of the terminal device 300 (see FIG. 1) starts the image process illustrated in FIG. 5 on the basis of a print instruction from a user.

In S100, the CPU 310 acquires target image data to be used for printing, that is, the target image data representing an image OI (a target image) to be printed. For example, the target image data is selected from a plurality of sets of image data stored in the non-volatile memory 320 according to a designation by the user. The target image data acquired in this embodiment includes a plurality of pixel values. Each of the plurality of pixel values is an RGB value representing the color of a pixel. In other words, the target image data is RGB image data. The RGB value of a pixel includes three component values corresponding to red (R), green (G), and blue (B) colors (hereinafter these component values are also referred to as R value, G value, and B value, respectively). In the case where the acquired target image data is not RGB image data, the target image data is converted to RGB image data through rasterization for example.

In S105, the CPU 310 acquires an instruction for selecting a printing mode and an instruction for selecting the size of a sheet M to be used in the printing to be performed. In this embodiment, the printing mode to be selected is either an image-quality priority mode or a speed priority mode. The size of the sheet M is selected from a plurality of sizes including an A4 size and an A3 size larger than the A4 size. For example, the size of the sheet M is selected from three sizes B5, A4, and A3. For example, the CPU 310 instructs the display 370 to display a user interface (UI) screen (not illustrated) and receives an instruction on the selection of the printing mode and an instruction on the selection of the size of the sheet M from a user through the UI screen.

In S110, the CPU 310 determines whether the selected printing mode is the image-quality priority mode on the basis of the received instruction. If the selected printing mode is the image-quality priority mode (S110: YES), the CPU 310 proceeds to S130. If the printing mode is the speed priority mode (S110: NO), the CPU 310 proceeds to S115.
In S115 the CPU 310 determines whether the size of the sheet M to be used in the printing is A3 on the basis of the received selection instruction. If the size of the sheet M is A3 (S115: YES), the CPU 310 proceeds to S130. If the size of the sheet M is A4 or B5, which is smaller than A3, (S115: NO), the CPU 310 proceeds to S120.

In S120, the CPU 310 analyzes each set of partial image data in the target image. Here, the CPU 310 divides the target image data into a plurality sets of partial image data corresponding to respective ones of the plurality of partial images in the target image. Specifically, the CPU 310 counts the number of particular color pixels in each partial image PI in the image OI. The "particular color pixel" refers to a pixel having a particular color producing a large outgoing/return color difference as described above. A pixel having an RGB value within the range indicated in the particular color information CI (see FIG. 1) is determined to be a particular color pixel.

In S125, the CPU 310 determines whether every partial image PI in the image OI includes the number of particular color pixels larger than or equal to a reference value. In other words, the CPU 310 determines whether a color difference for each partial image PI is larger than or equal to a specific reference by determining whether the partial image PI in the image OI includes the number of particular color pixels larger than or equal to the reference value. Here, the color difference is an estimated difference between color printed using first data by the outgoing print and color printed using second data by the return print. The first data is generated by converting the set of partial image data using the outgoing profile PF1. The second data is generated by converting the set of partial image data using the return profile PF2. If the number of particular color pixels included in a specific partial image PI is larger than or equal to the number corresponding to a predetermined percentage (20% for example) of the total number of the partial image PI, the specific partial image PI is determined to include the number of particular color pixel larger than or equal to the reference value. If every partial image PI includes the number of particular color pixels larger than or equal to the reference value (S125: YES), the CPU 310 proceeds to S130. If at least one of the partial images PI includes the number of particular color pixels smaller than the reference value (S125: NO), the CPU 310 proceeds to S135.

In S130, the CPU 310 executes a unidirectional printing process to instruct the printer 200 to print the image OI in the unidirectional printing method. In S135, the CPU 310 executes a bidirectional printing process to instruct the printer 200 to print the image OI in the bidirectional printing method.

A-4. Unidirectional Printing Process

Figure 6:
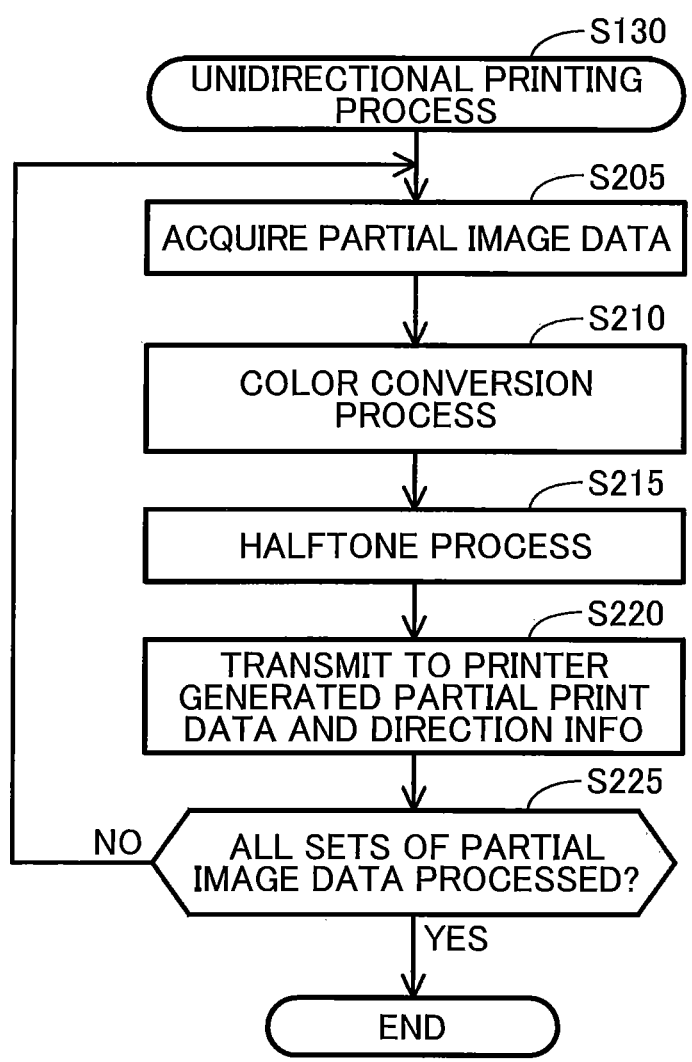
FIG. 6 is a flowchart illustrating a unidirectional printing process.

FIG. 6 is a flow chart illustrating a unidirectional printing process. In S205, the CPU 310 acquires a set of partial image data corresponding to one partial print from the target image data as target partial image data. The partial image PI corresponding to the target partial image data is referred to as "target partial image." The partial print performed to print the target partial image is also referred to as "target partial print." Sets of partial image data are acquired as follows. The CPU 310 selects the partial images in a sequential order in the −Y direction. The CPU 310 acquires a set of target image data corresponding to the selected partial image. In other words, the CPU 310 acquires the sets of target image data according to the sequential order of the partial images. For example, the CPU 310 firstly selects a top partial image and acquires a set of target image data corresponding to the top partial image, and secondly selects a partial image next to the top partial image in the −Y direction and acquires the set of partial image data corresponding to this next partial image.

In S210, the CPU 310 performs a color conversion process on the target partial image data using the outgoing profile PF3 for the unidirectional printing method. Accordingly, the target partial image data of RGB image data is converted to CMYK image data. The CMYK image data represents the colors of pixels in CMYK value, as described above.

In S215, the CPU 310 performs a halftone process on the color-converted target partial image data to generate partial print data for the target partial print. The halftone process is performed in accordance with a known method, for example, an error diffusion method. The generated partial print data (referred to as "dot data") indicates a dot formation state for each color component and each pixel. The dot formation state indicates, for example, the presence or absence of a dot. Alternatively, the dot formation state may indicate the size of a dot (large, medium, or small) or the absence of a dot.

In S220, the CPU 310 sends to the printer 200 the generated partial print data and direction information indicating the printing direction of the target partial print. When the printer 200 receives the partial print data and the direction information, the CPU 210 of the printer 200 performs a partial print in accordance with the received partial print data and the direction information to print a target partial image. In the unidirectional printing process, the direction information always indicates the outgoing direction. Hence, the CPU 210 performs the outgoing print to print the target partial image.

In S225, the CPU 310 determines whether all sets of partial image data for the image OI are processed. If any partial image data remains unprocessed (S225: NO), the CPU 310 returns S205. If all sets of partial image data are processed (S225: YES), the CPU 310 ends the unidirectional printing process.

A-5. Bidirectional Printing Process

Figure 7:
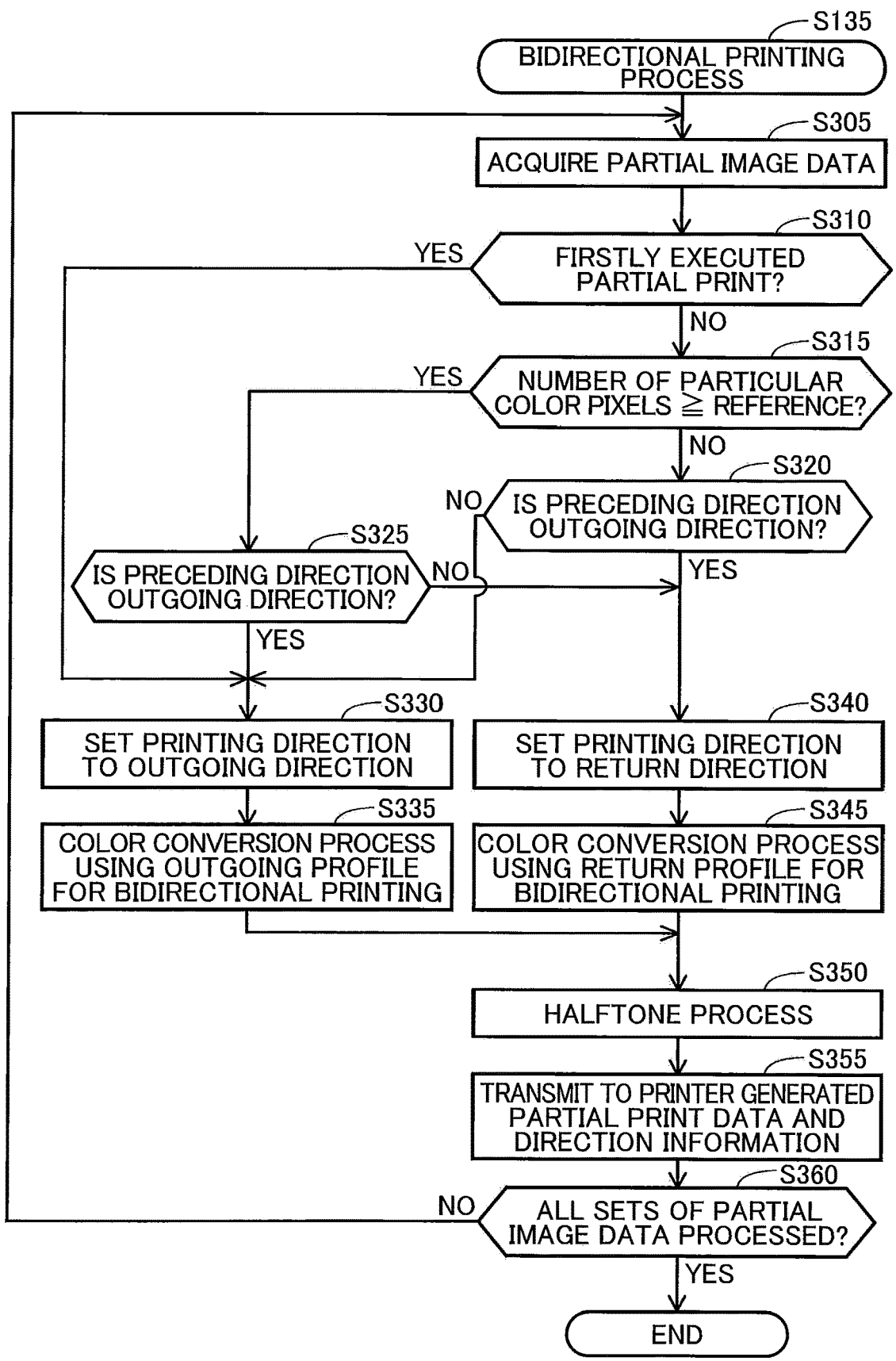
FIG. 7 is a flowchart illustrating a bidirectional printing process.

FIG. 7 is a flowchart illustrating a bidirectional printing process. In S305, the CPU 310 acquires a set of partial image data corresponding to one partial print from the target image data as target partial image data. The CPU 310 acquires each set of partial image data in the sequential order similarly to S205.

In S310, the CPU 310 determines whether the target partial image is a partial image to be firstly printed in the partial print from among all the partial images in the image OI. For example, the partial image PI1 illustrated in FIGS. 3(A) to 3(C) is a partial image firstly printed in the partial print. If the target partial image is the partial image PI1 to be firstly printed in the partial print (S310: YES), in S330 the CPU 310 sets the printing direction of the target partial print (also referred to as "target printing direction") to the outgoing direction. If the target partial image is not the partial image PI1 to be firstly printed in the partial print (S310: NO), the CPU 310 proceeds to S315.

In S315, the CPU 310 determines whether the target partial image includes the number of particular color pixels larger than or equal to the reference value. In other words, the CPU 310 determines whether a color difference is larger than or equal to a specific reference by determining whether the partial image PI in the image OI includes the number of particular color pixels larger than or equal to the reference value. Here, the color difference is an estimated difference between color printed using first data by the outgoing print and color printed using second data by the return print. The first data is generated by converting the partial image data using the outgoing profile PF1. The second data is generated by converting the partial image data using the return profile PF2. As described above, pixels having RGB values within the range indicated by the particular color information CI (see FIG. 1) are determined to be particular color pixels. As described above, if the number of particular color pixels included in a specific partial image PI is larger than or equal to the number corresponding to a predetermined percentage (20% for example) of the total number of the partial image PI, the specific partial image PI is determined to include the number of particular color pixel larger than or equal to the reference value.

If the target partial image includes the number of particular color pixels larger than or equal to the reference value (S315: YES), the CPU 310 sets the target printing direction to the printing direction of the preceding partial print (referred to as "preceding printing direction"). Specifically, in S325 the CPU 310 determines whether the preceding printing direction is the outgoing direction. If the preceding printing direction is the outgoing direction (S325: YES), in S330 the CPU 310 sets the target printing direction to the outgoing direction. If the preceding printing direction is the return direction (S325: NO), in S340 the CPU 310 sets the target printing direction to the return direction.

If the target partial image does not include the number of particular color pixels larger than or equal to the reference value (S315: NO), the CPU 310 sets the target printing direction to a direction opposite the preceding printing direction. Specifically, in S320 the CPU 310 determines whether the preceding printing direction is the outgoing direction. If the preceding printing direction is the outgoing direction (S320: YES), in S320 the CPU 310 sets the target printing direction to the return direction. If the preceding printing direction is the return direction (S320: NO), in S330 the CPU 310 sets the target printing direction to the outgoing direction.

When the target printing direction is set to the outgoing direction, in S335 the CPU 310 performs a color conversion process on the target partial image data using the outgoing profile PF1 for the bidirectional printing method. When the target printing direction is set to the return direction, in S345 the CPU 310 performs a color conversion process on the target partial image data using the return profile PF2 for the bidirectional printing method. Accordingly, the target partial image data of the RGB image data is converted to CMYK image data.

In S350, the CPU 310 performs the halftone process described above on the color-converted target partial image data to generate partial print data for the target partial print.

In S355 the CPU 310 transmits to the printer 200 the generated partial print data and the direction information indicating the set printing direction of the target partial print. When the printer 200 receives the partial print data and the direction information, the CPU 210 of the printer 200 performs a partial print in accordance with the partial print data and the direction information. For example, when the direction information indicates the outgoing direction, the CPU 210 performs the outgoing print to print the target image. When the direction information indicates the return direction, the CPU 210 performs the return print to print the target partial image.

In S360, the CPU 310 determines whether all the sets of partial image data of the image OI are processed. If any partial image data remains unprocessed (S360: NO), the CPU 310 returns S305. If all the sets of partial image data are processed (S360: YES), the CPU 310 ends the bidirectional image process.

In the above-described embodiment, the CPU 310 determines whether to perform a bidirectional printing process or a unidirectional printing process, as illustrated in FIG. 5. If the CPU 310 determines to print an image in the bidirectional printing method, the CPU 310 performs a first generation process (S335 and S350 in FIG. 7) including the color conversion process (S335 in FIG. 7) using the outgoing profile PF1 for the bidirectional printing method, to generate first partial print data for outgoing print. The CPU 310 then executes a second generation process (S345 and S350 in FIG. 7) including the color conversion process (S345 in FIG. 7) using the return profile PF2 for the bidirectional printing method, to generate second partial print data for return print. If the CPU 310 determines to print an image in the unidirectional printing method, the CPU 310 executes a third generation process (S210 and S215 in FIG. 6) including the color conversion process (S210 in FIG. 6) using the outgoing profile PF3 for the unidirectional printing method, to generate third partial print data for outgoing print. By appropriately selecting the profiles PF1 to PF3, the color gamut representable by the outgoing print in the bidirectional printing method does not include the color sub-gamuts A1 and A2 indicating colors representable by the outgoing print but not in the return print, and the color gamut representable by the return print does not include the color sub-gamuts B1 and B2 indicating colors representable by the return print but not in the outgoing print. As a result, in the bidirectional printing method, the outgoing partial images and the return partial images are printed without using colors in the color sub-gamuts A1, A2, B1, and B2, which are colors susceptible to producing large outgoing/return color differences. This can reduce the color irregularities across the outgoing partial image and the return partial image, i.e. the color irregularities due to the outgoing/return color difference. In the unidirectional printing method, the representable color gamut includes the color sub-gamuts A1 and A2. As a result, in the unidirectional printing method the image OI can be represented by a color gamut which is larger than the color gamut representable by the bidirectional printing process. Accordingly, in the bidirectional printing method the image OI can be represented with less color irregularities. On the other hand, in the unidirectional printing method, the image OI can be represented by a color gamut which is larger than the color gamut representable by the bidirectional printing method.

According to this embodiment, when the size of the sheet M to be used in the printing is B5 or A4 (S115: NO in FIG. 5), the CPU 310 determines to print an image in the bidirectional printing method unless every partial image includes the number of particular color pixels than the reference value (S135 in FIG. 5). If the size of the sheet M is A3 (S115: YES in FIG. 5), the CPU 310 determines to print an image in the unidirectional printing method. As a result, the printing method can be appropriately determined on the basis of the size of the sheet M. For example, when the size of a sheet M is A3 which is a relatively large sheet size, the objects in the printed image OI are likely to be drawings and photographs whose color irregularities are conspicuous, and the objects in the printed image OI are likely to include particular colors that cause color irregularities. When the size of the sheet M is A3, the printed image OI is also large. If such a large image OI has color irregularities, the color irregularities are conspicuous. Thus, when the size of the sheet M is A3, it is desirable to print an image in the unidirectional printing method in which color irregularities due to the outgoing/return color difference does not occur. In contrast, when the size of the sheet M is B5 or A4 which is a relatively small size, the printed image OI is less likely to have color irregularities and is more likely to include objects such as characters in which color irregularities are less conspicuous. Thus, when the size of the sheet M is B5 or A4, it is desirable to print an image in the bidirectional printing method in order to achieve high printing speed.

According to this embodiment, the CPU 310 determines whether the color difference between the outgoing partial image and the return partial image is larger than or equal to the specific reference on the basis of the target image data. Specifically, in S125 in FIG. 5, the CPU 310 determines whether every partial image PI includes the number of particular color pixels larger than or equal to the reference value. If the size of the sheet M is B5 or A4 (S115: NO in FIG. 5) and if the color difference is smaller than or equal to the specific reference (S125: NO in FIG. 5), the CPU 310 determines to print an image in the bidirectional printing method (S135 in FIG. 5). If the size of the sheet M is A3 (S115: YES in FIG. 5), or if the size of the sheet M is B5 or A4 (S115: NO in FIG. 5) and the color difference is larger than or equal to the specific reference (S125: YES in FIG. 5), the CPU 310 determines to print an image in the unidirectional printing method (S130 in FIG. 5). As a result, the printing method can be appropriately determined on the basis of the colors of the partial images PI. If the color difference between the outgoing partial images and the return partial images is larger than or equal to the specific reference, color irregularities due to the outgoing/return color difference is conspicuous. In such a case, it is desirable to print an image in the unidirectional printing method even when the size of the sheet M is B5 or A4.

According to this embodiment, the CPU 310 determines whether the color difference between the outgoing partial image and the return partial image is larger than or equal to the specific reference for each set of the partial image data (S315 in FIG. 7). Specifically, the CPU 310 determines, for each partial image PI, whether the partial image PI includes the number of particular color pixels larger than or equal to the reference value in S315 of FIG. 7. If the color difference of the target partial image is larger than or equal to the specific reference (S315: YES in FIG. 7), the CPU 310 determines the target printing direction to be the same direction as the preceding printing direction (S325, S330, and S340 in FIG. 7). If the color difference of the target partial image is smaller than the specific reference (S315: NO in FIG. 7), the CPU 310 determines the target printing direction to the direction opposite the preceding printing direction (S320, S330, and S340 in FIG. 7). As a result, the printing direction can be appropriately determined for each partial image on the basis of the outgoing/return color difference. This can suppress a noticeable outgoing/return color difference in the image OI and a reduction in image quality of the image OI.

In the example illustrated in FIG. 3(B), each of the hatched partial images PI2 and PI3 includes the number of particular color pixels larger than or equal to the reference value. As illustrated in FIG. 3(B), the partial images PI2 and PI3 are printed in the same direction as the printing direction of the preceding partial images PI1 and PI2, respectively. In such a case, although no-print main scanning is performed and thus the printing time is extended, the conspicuous outgoing/return color difference can be reduced and deterioration in the image quality of the image OI can be suppressed. For example, the partial images PI2 and PI3 in FIG. 3(B) are adjacent to each other and include the number of particular color pixels larger than or equal to the reference value. On the other hand, in a conceivable case where the partial images PI2 and PI3 are printed in different printing directions, the outgoing/return color difference may be conspicuous. However, in this embodiment, the partial images PI2 and PI3 are printed in the same printing direction, and thus the outgoing/return color difference does not occur between the partial images PI2 and PI3. In the embodiment described above, when some of the partial images include the number of particular color pixels larger than or equal to the reference value, the image is printed in the partially-bidirectional printing method in which some of the partial images are printed in the unidirectional printing method.

In the embodiment described above, when every partial image includes the number of particular color pixels larger than or equal to the reference value, the printing directions of all partial images is determined to be the same direction in the unidirectional printing process. Thus, in such a case, there is no need to execute the bidirectional printing process. In such a case, in view of image quality, it is desirable to print the image in the unidirectional printing method using the outgoing profile PF3 for the unidirectional printing method. Thus, in this embodiment, the CPU 310 determines whether every partial image includes the number of particular color pixels larger than or equal to the reference value in S125 in FIG. 5 before printing, and if every partial image includes the number of particular color pixels larger than or equal to the reference value (S125: YES in FIG. 5), the CPU 310 executes the unidirectional printing process (S135 in FIG. 5). As described above, if the printing directions of all partial images PI are determined to be the same direction (S125: YES in FIG. 5), the image is printed in the unidirectional printing method using the outgoing profile PF3 for the unidirectional printing method (S130 in FIG. 5). If one or more partial images do not include the number of particular color pixels larger than or equal to the reference value (S125: NO in FIG. 5), the printing directions of two or more partial images differ from each other. In this case, the image is printed in the bidirectional printing method using the outgoing profile PF1 and the return profile PF2 for the bidirectional printing method (S135 in FIG. 5). As a result, an image is appropriately printed by selecting the appropriate profiles PF1 to PF3 in accordance with whether the partial image includes the number of particular color pixels larger than or equal to the reference value.

Furthermore, if the speed priority mode is selected (S110: NO in FIG. 5), the image is printed in the bidirectional printing method on condition that the sheet size is not A3 and at least one partial image does not include the number of particular color pixels larger than or equal to the reference value (S135 in FIG. 5). If the image-quality priority mode is selected (S110: YES in FIG. 5), the image is printed in the unidirectional printing method (step S130 in FIG. 5). As a result, the printing method can be appropriately selected on the basis of the selection instruction of the printing mode by the user.

Furthermore, the printing resolution and the number of passes for the target image printed according to the bidirectional printing method are respectively the same as the printing resolution and the number of passes for the target image printed according to the unidirectional printing method. In other words, an image can be printed in the bidirectional printing method and the unidirectional printing method by appropriately selecting the profiles PF1 to PF3 while the same printing resolution and the number of passes are achieved.

B. Second Embodiment

In the second embodiment, the non-volatile memory 320 illustrated in FIG. 1 stores a return profile PF4 for the unidirectional printing method indicated by a dashed line in FIG. 1, in addition to the profiles PF1, PF2, and PF3. The return profile PF4 is used for generating partial print data for the return print in the unidirectional printing method. The color gamut representable by the return print using the return profile PF4 is substantially the same as the return color gamut RG representable by the return print. Specifically, the color gamut representable by the return print using the return profile PF4 includes the common color gamut CG and sub-color gamuts B1 and B2 indicating colors representable by the return print but not in the outgoing print.

In the second embodiment, in addition to the unidirectional printing method in which the partial print is performed with the printing direction set to only the outgoing direction (also referred to as "outgoing unidirectional printing method"), an unidirectional printing method in which the partial print is performed with the printing direction set to only the return direction (also referred to as "return unidirectional printing method") is executed. An outgoing unidirectional printing process is a printing process using the outgoing unidirectional printing method, and is the same as the unidirectional printing process in FIG. 6. A return unidirectional printing process is a printing process using the return unidirectional printing method. The return unidirectional printing process is basically the same as the unidirectional printing process in FIG. 6, except the following points. That is, in the return unidirectional printing process, the color conversion process in S210 uses the return profile PF4 in place of the outgoing profile PF3, and the direction information indicating the return direction is transmitted to the printer 200 in S220.

Figure 8:
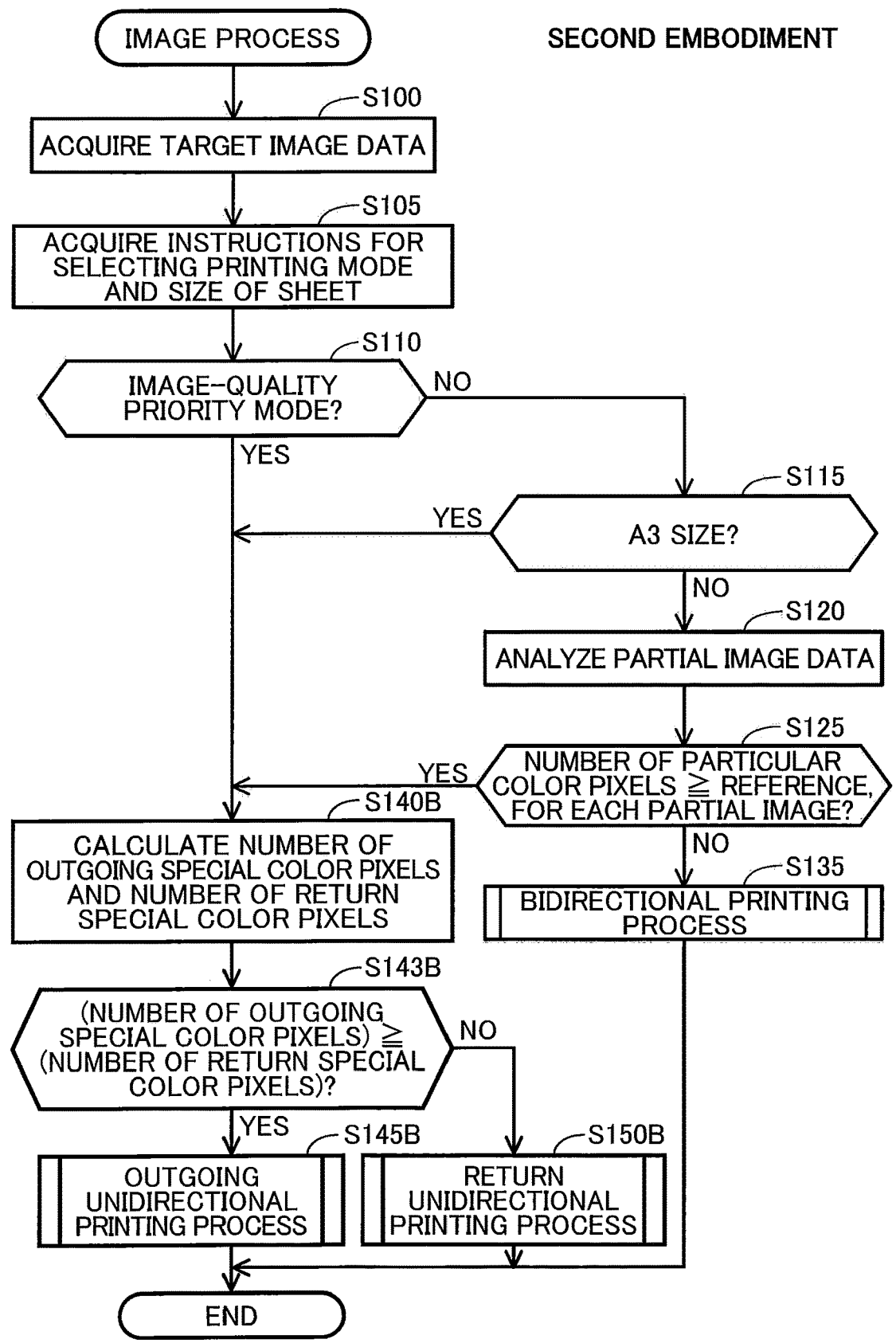
FIG. 8 is a flowchart illustrating an image process according to a second embodiment.

FIG. 8 is a flowchart illustrating the image process according to the second embodiment. The image process illustrated in FIG. 8 includes steps S140B to S150B in place of step S130 in the image process according to the first embodiment illustrated in FIG. 5. Other steps in the image process according to the second embodiment are the same as the steps in the image process illustrated in FIG. 5.

In S140B, the CPU 310 analyzes the target image data to calculate the number of outgoing special color pixels and the number of return special color pixels included in the target image. The outgoing special color pixel indicates a pixel in the image OI having an RGB value corresponding to a color belonging to the color sub-gamuts A1 and A2, which include colors representable by the outgoing print but not by the return print. The return special color pixel indicates a pixel having an RGB value in the image OI corresponding to a color belonging to the color sub-gamuts B1 and B2, which include colors representable by the return print but not by the outgoing print. In the second embodiment, the non-volatile memory 320 stores special color information LI indicated by a dashed line in FIG. 1. The special color information LI defines a range of RGB values corresponding to colors belonging to the color sub-gamuts A1 and A2 and a range of RGB values corresponding to colors belonging to the color sub-gamuts B1 and B2. The CPU 310 refers to the special color information LI to determine the outgoing special color pixels and the return special color pixels, and calculates the number of the outgoing special color pixels and the number of return special color pixels.

In S143B, the CPU 310 determines whether the number of outgoing special color pixels is larger than or equal to the number of return special color pixels. If the number of outgoing special color pixels is larger than or equal to the number of return special color pixels (S143B: YES), in S145B the CPU 310 executes the outgoing unidirectional printing process. In this case, an image OI is printed through unidirectional printing performed with the printing direction set to only the outgoing direction. If the number of outgoing special color pixels is smaller than the number of return special color pixels (S143B: NO), in S150B the CPU 310 executes the return unidirectional printing process. In this case, an image OI is printed through unidirectional printing performed with the printing direction set to only the return direction.

In the above-described second embodiment, the CPU 310 uses the target image data to select the printing method from the bidirectional printing method, the outgoing unidirectional printing method, and the return unidirectional printing method (FIG. 8). As a result, the image quality of the image OI can be improved depending on features of the target image data. For example, the outgoing unidirectional printing method is selected for an image including the relatively large number of outgoing special color pixels. In this case, an image OI is appropriately printed using colors in the color sub-gamuts A1 and A2. In contrast, the return unidirectional printing method is selected for an image including the relatively large number of return special color pixels. In this case, an image OI is appropriately printed using colors in the color sub-gamuts B1 and B2.

C. Variations of the Embodiments (1) Variations may be appropriately made to the steps S105 to S125 of the process for determining the method of printing (the bidirectional printing method or the unidirectional printing method) according to the embodiment illustrated in FIG. 5. For example, step S110 may be omitted. In such a case, the unidirectional printing method or the bidirectional printing method is selected on the basis of merely sheet size and determination of whether each partial image includes the number of particular color pixels larger than or equal to the reference value. Similarly, step S115 may be omitted, or step S125 may be omitted. In a case where a desirable printing direction depends on a print medium, or in a case where a print medium has different characteristics depending on the printing direction, the unidirectional printing method or the bidirectional printing method may be selected on the basis of the type of the print medium and/or the conveying direction of the print medium regardless of the sheet size.

(2) In an above embodiment, the bidirectional printing method includes an absolutely-bidirectional printing method and a partially-bidirectional printing method. Alternatively, the bidirectional printing method may include only the absolutely-bidirectional printing method.

(3) In the image process illustrated in FIG. 5, the CPU 310 determines whether every partial image PI includes the number of color pixels larger than or equal to the reference value in S125. Alternatively, the CPU 310 may determine whether the image represented by the target image data includes an object having an area of particular color pixels larger than or equal to a reference area. If the image includes the object having the area of particular color pixels larger than or equal to the reference area, the unidirectional printing process may be executed. The position of the object in the image can be determined through a known object recognition process, for example.

(4) In the bidirectional printing process illustrated in FIG. 7, the CPU 310 sets the target printing direction to the preceding printing direction when the CPU 310 determines that the target partial image includes the number of particular color pixels larger than or equal to the reference value in S315. Alternatively, the target printing direction may be determined in any other way. For example, the CPU 310 may set the target printing direction to the preceding printing direction when an object including particular color pixels is disposed across both the target partial image and the preceding partial image.

(5) The nozzle rows in the print head 110 may be arranged in any order from the upstream side in the +X direction in FIG. 2(B), instead of arrangement of the nozzle rows NY, NM, NC, and NK in the +X direction in this order. In order to reduce a color difference caused by the difference in the printing direction, the nozzles rows may be arranged symmetrically about change between the order in the outgoing direction and the order in the return direction. In other words, the arrangement of colors defined by the nozzle rows in the outgoing direction is the same as the arrangement of colors defined by the nozzle rows in the return direction. For example, seven nozzle rows NC, NM, NY, NK, NY, NM, and NC may be arranged in this order in the X direction.

(6) The recording sheet M may be an OHP film, a CD-ROM, or a DVD-ROM, instead of the paper.

(7) In the printing mechanism 100 according to the above-described embodiment, the conveyance unit 140 conveys the sheet M such that the sheet M moves in the conveying direction relative to the print head 110. Alternatively, the sheet M may move in the conveying direction relative to the print head 110 by moving the print head 110 in the direction opposite the conveying direction relative to a sheet M.

(8) In the above-described embodiments, the terminal device 300 is a device performing the image processes shown in FIGS. 5 and 8. Alternatively, the CPU 210 of the printer 200 may function as an image processing apparatus and perform one or more image processes shown in FIGS. 5 and 8. In such a case, the CPU 210 functioning as an image processing apparatus outputs print data and direction information to a predetermined memory area in the non-volatile memory 220 or the volatile memory 230 in S220 of FIGS. 6 and S355 of FIG. 7. The printing mechanism 100 of the printer 200 performs partial print in accordance with the print data and the direction information which are output to the memory area.

In the embodiments, the terminal device 300 is an example of the image processing apparatus, and the printer 200 is an example of the print execution unit. In this variation (8), the CPU 210 of the printer 200 is an example of the image processing apparatus, and the print mechanism 100 is an example of the print execution unit.

The device performing the image processes shown in FIGS. 5 and 8 may be a server that acquires image data from a printer or a terminal device to generate a print job using the acquired print data. Such a server may include a plurality of computers in communication with each other via a network. In such a case, the plurality of computers in communication with each other via a network as a whole is an example of the image processing apparatus.

(9) In the embodiments, at least part of the configuration implemented by hardware may be replaced by software and, conversely at least part of the configuration implemented by software may be replaced by hardware. For example, in a case where the printer 200 executes the image process A shown in FIG. 5, the color conversion process or the color reconversion process and the halftone process may be executed by dedicated hardware such as an ASIC which operates in accordance with instructions from the CPU 210 of the printer 200.

The processes or the steps described in the embodiments and the variations may be arbitrary combined.

While the disclosure has been described in detail with reference to the above embodiments, it would be apparent to those skilled in the art that various changes and modifications may be made thereto.

What is claimed is:

1. An image processing apparatus comprising:
a processor for controlling a print execution unit including:
a print head moving in a main scanning direction including a first direction and a second direction opposite the first direction, the print head including a first nozzle configured to eject first type ink, and a second nozzle configured to eject second type ink, the second nozzle being positioned apart from the first nozzle in the main scanning direction;
a main scanning unit configured to perform a main scan, the main scan including a first main scan to move the print head in the first direction as a printing direction, and a second main scan to move the print head in the second direction as the printing direction; and
a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, the target image being based on target image data having a plurality of sets of partial image data representing respective ones of a plurality of partial images in the target image, the partial print being one of a first partial print and a second partial print, wherein in the first partial print the print head forms dots on the recording sheet for printing a partial image in the target image while the main scanning unit performs the first main scan, the first partial print being capable of printing colors forming a first color gamut, wherein in the second partial print the print head forms dots on the recording sheet for printing a partial image in the target image while the main scanning unit performs the second main scan, the second partial print being capable of printing colors forming a second color gamut, the first color gamut including a common gamut and a first special gamut, the second color gamut including the common gamut and a second special gamut different from the first special gamut; and
a memory storing a first color conversion profile, a second color conversion profile, and a third color conversion profile, each of the first color conversion profile, the second color conversion profile, and the third color conversion profile being used for converting a first type color value into a second type color value having a plurality of component values corresponding to respective ones of a plurality of types of ink including the first type ink and the second type ink, the first color conversion profile and the second color conversion profile being adjusted so that a first printed color approaches a second printed color, wherein the first printed color is printed through the first partial print based on a first converted color value which is one of the second type color value converted from an original color of the first type color value by using the first color conversion profile, and the second printed color is printed through the second partial print based on a second converted color value which is one of the second type color value converted from the original color by using the second color conversion profile, the first color conversion profile being used for generating data for performing the first partial print in a bidirectional printing method, the second color conversion profile being used for generating data for performing the second partial print in the bidirectional printing method, the third color conversion profile being used for generating data for a unidirectional printing method, wherein in the bidirectional printing method the print execution unit prints the target image using both the first partial print and the second partial print, and in the unidirectional printing method the print execution unit prints the target image using the first partial print without using the second partial print,
wherein when the first partial print prints colors based on color values of the second type color value converted from original color values of the first type color value by using the first color conversion profile, a color gamut formed by the colors printed by the first partial print includes the common gamut and excludes at least part of the first special gamut,
wherein when the second partial print prints colors based on color values of the second type color value converted from original color values of the first type color value by using the second color conversion profile, a color gamut formed by the colors printed by the second partial print includes the common gamut and excludes at least part of the second special gamut,
wherein when the first partial print prints colors based on color values of the second type color value converted from original color values of the first type color value by using the third color conversion profile, a color gamut formed by the colors printed by the first partial print includes the common gamut and the first special gamut,
wherein the processor is configured to perform:
setting a target printing method for printing the target image on the recording sheet to one of a plurality of printing methods including the bidirectional printing method and the unidirectional printing method;
in a case where the bidirectional printing method is set as the target printing method:
executing both a first generation process and a second generation process, the first generation process generating first partial print data by converting a set of partial image data using the first color conversion profile, the second generation process generating second partial print data by converting another set of partial image data using the second color conversion profile; and
controlling the print execution unit to perform printing according to the bidirectional printing method by using the first partial print data for the first partial print and the second partial print data for the second partial print; and
in a case where the unidirectional printing method is set as the target printing method:
executing a third generation process generating third partial print data by converting a set of partial image data using the third color conversion profile; and
controlling the print execution unit to perform printing according to the unidirectional printing method by using the third partial print data for the first partial print.

2. The image processing apparatus according to claim 1, wherein the processor is configured to further perform acquiring a target size of the recording sheet, the target size indicating one of a plurality of sizes including a first size and a second size larger than the first size,
- wherein in a case where a first condition is satisfied, the processor sets the target printing method to the bidirectional printing method, the first condition including a condition that the target size indicates the first size,
- wherein in a case where a second condition is satisfied, the processor sets the target printing method to the unidirectional printing method, the second condition including a condition that the target size indicates the second size.

3. The image processing apparatus according to claim 2, wherein the processor is configured to further perform determining, for each of the plurality of sets of partial image data, whether a color difference is larger than or equal to a reference, the color difference indicating a difference between color printed using the first partial print data by the first partial print and color printed using the second partial print data by the second partial print,
- wherein for each set of partial image data when the set of partial image data includes a number of pixels having pixel values in a predetermined range larger than or equal to a threshold value, the color difference is larger than or equal to the reference,
- wherein for each set of partial image data when the set of partial image data includes a number of pixels having pixel values in a predetermined range smaller than the threshold value, the color difference is smaller than the reference,
- wherein the first condition further includes a condition that the color difference is smaller than the reference for at least one set of partial image data,
- wherein in the case where the second condition is satisfied, or a case where a third condition is satisfied, the processor sets the target printing method to the unidirectional printing method, the third condition including a condition that the color difference is larger than or equal to the reference for all of the plurality of sets of partial image data.

4. The image processing apparatus according to claim 3, wherein the processor is configured to further perform:
- in a case where a fourth condition is satisfied, setting a printing direction for a target partial print to a preceding printing direction, the fourth condition including a condition that the color difference is larger than or equal to the reference for a set of target partial image data used for the target partial print, wherein in the target partial print to be executed, the print head is moved in the printing direction, wherein the preceding printing direction is one of the first direction and the second direction, wherein in a preceding partial print preceding the target partial print, the print head is moved in the preceding printing direction,
- in a case where a fifth condition is satisfied, setting the printing direction opposite the preceding printing direction, the fifth condition including a condition that the color difference is smaller than the reference for a set of target partial image data used for the target partial print,
- wherein a sixth condition is satisfied, setting the target printing method to the unidirectional printing method, the sixth condition including a condition that all of printing directions for partial prints to be executed for printing the entire target image are determined to be a same direction,
- wherein in a case where a seventh condition is satisfied, the processor sets the target printing method to the bidirectional printing method, the sixth condition including a condition that two printing directions for corresponding two partial prints are determined to be different from each other.

5. The image processing apparatus according to claim 1, wherein the processor is configured to further perform determining, for each of the plurality of sets of partial image data, whether a color difference is larger than or equal to a reference, the color difference indicating a difference between color printed using the first partial print data by the first partial print and color printed using the second partial print data by the second partial print,
- wherein for each set of partial image data when the set of partial image data includes a number of pixels having pixel values in a predetermined range larger than or equal to a threshold value, the color difference is larger than or equal to the reference,
- wherein for each set of partial image data when the set of partial image data includes a number of pixels having pixel values in a predetermined range smaller than the threshold value, the color difference is smaller than the reference,
- wherein in a case where a first condition is satisfied, the processor sets the target printing method to the unidirectional printing method, the first condition including a condition that the color difference is larger than or equal to the reference for all of the plurality of sets of partial image data,
- wherein in a case where a second condition is satisfied, the processor sets the target printing method to the bidirectional printing method, the second condition including a condition that the color difference is smaller than the reference for at least one set of partial image data.

6. The image processing apparatus according to claim 1, wherein the processor is configured to further perform receiving a selection instruction by a user, the selection instruction indicating a selection mode which is either one of a first mode and a second mode,
- wherein in a case where a first condition is satisfied, the processor sets the target printing method to the bidirectional printing method, the first condition including a condition that the selection mode is the first mode,
- wherein in a case where a second condition is satisfied, the processor sets the target printing method to the unidirectional printing method, the second condition including a condition that the selection mode is the second mode.

7. The image processing apparatus according to claim 1, wherein the memory further stores a fourth color conversion profile for the unidirectional printing method, the fourth color conversion profile being used for converting the first type color value into a second type color value having a plurality of component values corresponding to respective ones of a plurality of types of ink including the first type ink and the second type ink,
- wherein when the second partial print prints colors based on color values of the second type color value converted from original colors of the first type color value by using the fourth color conversion profile, a color gamut formed by the colors printed by the second partial print includes the common gamut and the second special gamut,
- wherein the processor sets the target printing method to one of the plurality of printing methods including the bidirectional printing method, the unidirectional printing method, and a second unidirectional printing method, wherein in the second unidirectional printing method, the print execution unit prints the target image using the second partial print without using the first partial print, wherein the processor is configured to further perform, in a case where the second unidirectional printing method is set as the target printing method:

executing a fourth generation process for generating fourth partial print data by converting a set of partial image data using the fourth color conversion profile; and controlling the print execution unit to perform printing according to the second unidirectional printing method by using the fourth partial print data.

8. The image processing apparatus according to claim 1, wherein number of passes executed to print the entire image in the bidirectional printing method is the same as number of passes executed to print the entire image in the unidirectional printing method, each of the passes indicates execution of one of the first partial print and the second partial print.

9. The image processing apparatus according to claim 6, wherein the first mode is a speed priority mode in which a priority is given to printing speed, wherein the second mode is an image-quality priority mode in which a priority is given to image quality.

10. A non-transitory computer readable storage medium storing a set of program instructions for an image processing apparatus, the image processing apparatus controlling a print execution unit including: a print head moving in a main scanning direction including a first direction and a second direction opposite the first direction, the print head including a first nozzle configured to eject first type ink, and a second nozzle configured to eject second type ink, the second nozzle being positioned apart from the first nozzle in the main scanning direction; a main scanning unit configured to perform a main scan, the main scan including a first main scan to move the print head in the first direction as a printing direction, and a second main scan to move the print head in the second direction as the printing direction; and a sub scanning unit configured to perform a sub scan to move a recording sheet relative to the print head in a sub scanning direction crossing the main scanning direction, the print execution unit performing printing a target image on the recording sheet by alternately executing a partial print and the sub scan a plurality of times, the target image being based on target image data having a plurality of sets of partial image data representing respective ones of a plurality of partial images in the target image, the partial print being one of a first partial print and a second partial print, wherein in the first partial print the print head forms dots on the recording sheet for printing a partial image in the target image while the main scanning unit performs the first main scan, the first partial print being capable of printing colors forming a first color gamut, wherein in the second partial print the print head forms dots on the recording sheet for printing a partial image in the target image while the main scanning unit performs the second main scan, the second partial print being capable of printing colors forming a second color gamut, the first color gamut including a common gamut and a first special gamut, the second color gamut including the common gamut and a second special gamut different from the first special gamut, the image processing apparatus including a memory storing a first color conversion profile, a second color conversion profile, and a third color conversion profile, each of the first color conversion profile, the second color conversion profile, and the third color conversion profile being used for converting a first type color value into a second type color value having a plurality of component values corresponding to respective ones of a plurality of types of ink including the first type ink and the second type ink, the first color conversion profile and the second color conversion profile being adjusted so that a first printed color approaches a second printed color, wherein the first printed color is printed through the first partial print based on a first converted color value which is one of the second type color value converted from an original color of the first type color value by using the first color conversion profile, and the second printed color is printed through the second partial print based on a second converted color value which is one of the second type color value converted from the original color by using the second color conversion profile, the first color conversion profile being used for generating data for performing the first partial print in a bidirectional printing method, the second color conversion profile being used for generating data for performing the second partial print in the bidirectional printing method, the third color conversion profile being used for generating data for a unidirectional printing method, wherein in the bidirectional printing method the print execution unit prints the target image using both the first partial print and the second partial print, and in the unidirectional printing method the print execution unit prints the target image using the first partial print without using the second partial print, wherein when the first partial print prints colors based on color values of the second type color value converted from original color values of the first type color value by using the first color conversion profile, a color gamut formed by the colors printed by the first partial print includes the common gamut and excludes at least part of the first special gamut, wherein when the second partial print prints colors based on color values of the second type color value converted from original color values of the first type color value by using the second color conversion profile, a color gamut formed by the colors printed by the second partial print includes the common gamut and excludes at least part of the second special gamut, wherein when the first partial print prints colors based on color values of the second type color value converted from original color values of the first type color value by using the third color conversion profile, a color gamut formed by the colors printed by the first partial print includes the common gamut and the first special gamut, the set of program instructions comprising:

setting a target printing method for printing the target image on the recording sheet to one of a plurality of printing methods including the bidirectional printing method and the unidirectional printing method;

in a case where the bidirectional printing method is set as the target printing method:

executing both a first generation process and a second generation process, the first generation process generating first partial print data by converting a set of partial image data using the first color conversion profile, the second generation process generating second partial print data by converting another set of partial image data using the second color conversion profile; and controlling the print execution unit to perform printing according to the bidirectional printing method by using the first partial print data for the first partial print and the second partial print data for the second partial print; and in a case where the unidirectional printing method is set as the target printing method:
   executing a third generation process generating third partial print data by converting a set of partial image data using the third color conversion profile; and
   controlling the print execution unit to perform printing according to the unidirectional printing method by using the third partial print data for the first partial print.

* * * * *